United States Patent
Oberheide et al.

(10) Patent No.: US 9,491,175 B2
(45) Date of Patent: *Nov. 8, 2016

(54) SYSTEM AND METHOD FOR PROXYING FEDERATED AUTHENTICATION PROTOCOLS

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/517,078

(22) Filed: Oct. 17, 2014

(65) Prior Publication Data

US 2015/0040190 A1     Feb. 5, 2015

Related U.S. Application Data

(63) Continuation of application No. 14/188,449, filed on Feb. 24, 2014, now Pat. No. 8,893,230.

(60) Provisional application No. 61/768,233, filed on Feb. 22, 2013.

(51) Int. Cl.
*H04L 9/32* (2006.01)
*H04L 29/06* (2006.01)

(52) U.S. Cl.
CPC ................. *H04L 63/0884* (2013.01)

(58) Field of Classification Search
CPC ... H04L 63/08; H04L 63/10; H04L 63/0884; G06F 21/31; G06F 21/44; G06F 21/45; G06F 21/445

USPC .................. 726/1–8, 12; 713/150–152, 155, 713/168–170
See application file for complete search history.

(56) References Cited

U.S. PATENT DOCUMENTS

| | | |
|---|---|---|
| 5,838,792 A | 11/1998 | Ganesan |
| 5,870,723 A | 2/1999 | Pare et al. |
| 6,119,096 A | 9/2000 | Mann et al. |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 7,096,354 B2 | 8/2006 | Wheeler et al. |
| 7,331,518 B2 | 2/2008 | Rable |
| 7,447,784 B2 | 11/2008 | Eun |
| 7,463,637 B2 * | 12/2008 | Bou-Diab ............... H04L 63/08 370/352 |
| 7,526,792 B2 | 4/2009 | Ross |

(Continued)

OTHER PUBLICATIONS

Simske et al., "APEX: Automated Policy Enforcement eXchange", Sep. 21-24, 2010, ACM pp. 139-142.

(Continued)

*Primary Examiner* — Hosuk Song
(74) *Attorney, Agent, or Firm* — Jeffrey Schox; Padowithz Alce

(57) ABSTRACT

A system and method that include receiving a service provider identity request through a federated authentication protocol; transmitting a proxy identity request to a configured identity provider; receiving an identity assertion; facilitating execution of a second layer of authentication; determining a proxy identity assertion based on the identity assertion and the second layer of authentication; and transmitting the proxy identity assertion to the service provider.

15 Claims, 15 Drawing Sheets

(56) References Cited

U.S. PATENT DOCUMENTS

| | | | |
|---|---|---|---|
| 7,562,382 B2* | 7/2009 | Hinton | H04L 67/30 709/225 |
| 7,574,733 B2 | 8/2009 | Woodhill | |
| 7,953,979 B2* | 5/2011 | Borneman | G06F 21/41 713/156 |
| 7,982,595 B2 | 7/2011 | Hanna et al. | |
| 8,136,148 B1 | 3/2012 | Chayanam et al. | |
| 8,161,527 B2 | 4/2012 | Curren | |
| 8,200,980 B1 | 6/2012 | Robinson et al. | |
| 8,245,044 B2 | 8/2012 | Kang | |
| 8,332,627 B1 | 12/2012 | Matthews et al. | |
| 8,335,933 B2 | 12/2012 | Humphrey et al. | |
| 8,397,301 B2 | 3/2013 | Hering et al. | |
| 8,402,526 B2 | 3/2013 | Ahn | |
| 8,458,798 B2 | 6/2013 | Williams et al. | |
| 8,495,720 B2 | 7/2013 | Counterman | |
| 8,499,339 B2 | 7/2013 | Chao et al. | |
| 8,538,028 B2 | 9/2013 | Yeap et al. | |
| 8,627,438 B1 | 1/2014 | Bhimanaik | |
| 8,646,086 B2 | 2/2014 | Chakra et al. | |
| 8,689,287 B2* | 4/2014 | Bohmer | H04L 63/0853 709/225 |
| 8,700,729 B2 | 4/2014 | Dua | |
| 8,732,475 B2 | 5/2014 | Fahrny et al. | |
| 8,732,839 B2 | 5/2014 | Hohl | |
| 8,763,077 B2 | 6/2014 | Oberheide et al. | |
| 8,850,516 B1* | 9/2014 | Hrebicek | G06F 17/30117 707/610 |
| 8,893,230 B2* | 11/2014 | Oberheide | H04L 63/0884 726/2 |
| 8,898,762 B2 | 11/2014 | Kang | |
| 2002/0123967 A1 | 9/2002 | Wang | |
| 2003/0115452 A1 | 6/2003 | Sandhu et al. | |
| 2003/0126472 A1 | 7/2003 | Banzhof | |
| 2003/0147536 A1 | 8/2003 | Andivahis et al. | |
| 2004/0064706 A1 | 4/2004 | Lin et al. | |
| 2005/0218215 A1 | 10/2005 | Lauden | |
| 2005/0221268 A1 | 10/2005 | Chaar et al. | |
| 2005/0268107 A1 | 12/2005 | Harris et al. | |
| 2006/0130139 A1 | 6/2006 | Sobel et al. | |
| 2006/0165060 A1 | 7/2006 | Dua | |
| 2006/0182276 A1 | 8/2006 | Sandhu et al. | |
| 2006/0242692 A1 | 10/2006 | Thione et al. | |
| 2007/0199060 A1 | 8/2007 | Touboul | |
| 2007/0228148 A1 | 10/2007 | Rable | |
| 2007/0250914 A1 | 10/2007 | Fazal et al. | |
| 2007/0284429 A1 | 12/2007 | Beeman | |
| 2008/0049642 A1 | 2/2008 | Gudipudi et al. | |
| 2008/0120411 A1 | 5/2008 | Eberle | |
| 2009/0055906 A1 | 2/2009 | Wendorff | |
| 2009/0187986 A1 | 7/2009 | Ozeki | |
| 2009/0300596 A1 | 12/2009 | Tyhurst et al. | |
| 2009/0300707 A1 | 12/2009 | Garimella et al. | |
| 2010/0042954 A1 | 2/2010 | Rosenblatt et al. | |
| 2010/0069104 A1 | 3/2010 | Neil et al. | |
| 2010/0114740 A1 | 5/2010 | Dominguez et al. | |
| 2010/0115578 A1 | 5/2010 | Nice et al. | |
| 2010/0121767 A1 | 5/2010 | Coulter et al. | |
| 2010/0125737 A1 | 5/2010 | Kang | |
| 2010/0180001 A1 | 7/2010 | Hardt | |
| 2010/0202609 A1 | 8/2010 | Sandhu et al. | |
| 2010/0216425 A1 | 8/2010 | Smith | |
| 2010/0217986 A1 | 8/2010 | Schneider | |
| 2010/0233996 A1 | 9/2010 | Herz et al. | |
| 2010/0330969 A1 | 12/2010 | Kim et al. | |
| 2011/0086616 A1 | 4/2011 | Brand et al. | |
| 2011/0107389 A1 | 5/2011 | Chakarapani | |
| 2011/0138469 A1 | 6/2011 | Ye et al. | |
| 2011/0197267 A1 | 8/2011 | Gravel et al. | |
| 2011/0219449 A1 | 9/2011 | St. Neitzel et al. | |
| 2011/0277025 A1 | 11/2011 | Counterman | |
| 2011/0302410 A1 | 12/2011 | Clarke et al. | |
| 2011/0302630 A1 | 12/2011 | Nair et al. | |
| 2012/0090028 A1 | 4/2012 | Lapsley et al. | |
| 2012/0096274 A1 | 4/2012 | Campagna et al. | |
| 2012/0198050 A1 | 8/2012 | Maki et al. | |
| 2012/0216239 A1 | 8/2012 | Yadav et al. | |
| 2012/0300931 A1 | 11/2012 | Ollikainen et al. | |
| 2013/0042002 A1 | 2/2013 | Cheeniyil et al. | |
| 2013/0081101 A1 | 3/2013 | Baer et al. | |
| 2013/0097585 A1 | 4/2013 | Jentsch et al. | |
| 2013/0110676 A1 | 5/2013 | Kobres | |
| 2013/0125226 A1 | 5/2013 | Shah et al. | |
| 2013/0174246 A1 | 7/2013 | Schrecker et al. | |
| 2013/0179681 A1 | 7/2013 | Benson et al. | |
| 2013/0326493 A1 | 12/2013 | Poonamalli et al. | |
| 2014/0047546 A1 | 2/2014 | Sidagni | |
| 2014/0188796 A1 | 7/2014 | Fushman et al. | |
| 2014/0208405 A1 | 7/2014 | Hashai | |
| 2014/0235230 A1 | 8/2014 | Raleigh | |
| 2014/0237236 A1 | 8/2014 | Kalinichenko et al. | |
| 2014/0245278 A1 | 8/2014 | Zellen | |
| 2014/0351954 A1 | 11/2014 | Brownell et al. | |
| 2015/0012914 A1 | 1/2015 | Klein et al. | |

OTHER PUBLICATIONS

Symantec, Administration Guide for Symantec TM Endpoint Protection and Symantec Network Access Control, Aug. 1, 2007.

* cited by examiner

SYSTEM AND METHOD FOR PROXYING FEDERATED AUTHENTICATION PROTOCOLS

CROSS-REFERENCE TO RELATED APPLICATIONS

This application is a continuation of co-pending U.S. patent application Ser. No. 14/188,449, filed 24 Feb. 2014, which claims the benefit of U.S. Provisional Application Ser. No. 61/768,233, filed on 22 Feb. 2013, both of which are incorporated in their entirety by this reference.

TECHNICAL FIELD

This invention relates generally to the authentication and authorization field, and more specifically to a new and useful system and method for proxying authentication providers in the authentication and authorization field.

BACKGROUND

Security Assertion Markup Language (SAML) is an XML-based data format used for security assertions. Service providers (SP) will typically allow an entity (e.g., a user, administrator, or enterprise) to configure the system for SAML delegation to an identity provider (IdP). For an enterprise, instead of making employees maintain multiple authentication credentials for internal enterprise system and for the service provider, the service provider can use the IdP so only one set of credentials may be used by an employee. When the user attempts to use a service of the service provider, the SP can request to authenticate the user through the IdP. Based on an identity assertion response of the IdP, the SP can make an access control decision. Many service providers only allow a single IdP service to be configured. However, such implementation limits authentication security to the security level of the IdP. Thus, there is a need in the authentication and authorization field to create a new and useful system and method for proxying authentication providers. This invention provides such a new and useful system and method.

BRIEF DESCRIPTION OF THE FIGURES

FIG. 14 is a schematic representation of an alternative embodiment for single sign-on.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Proxying Authentication Providers

Figure 1:
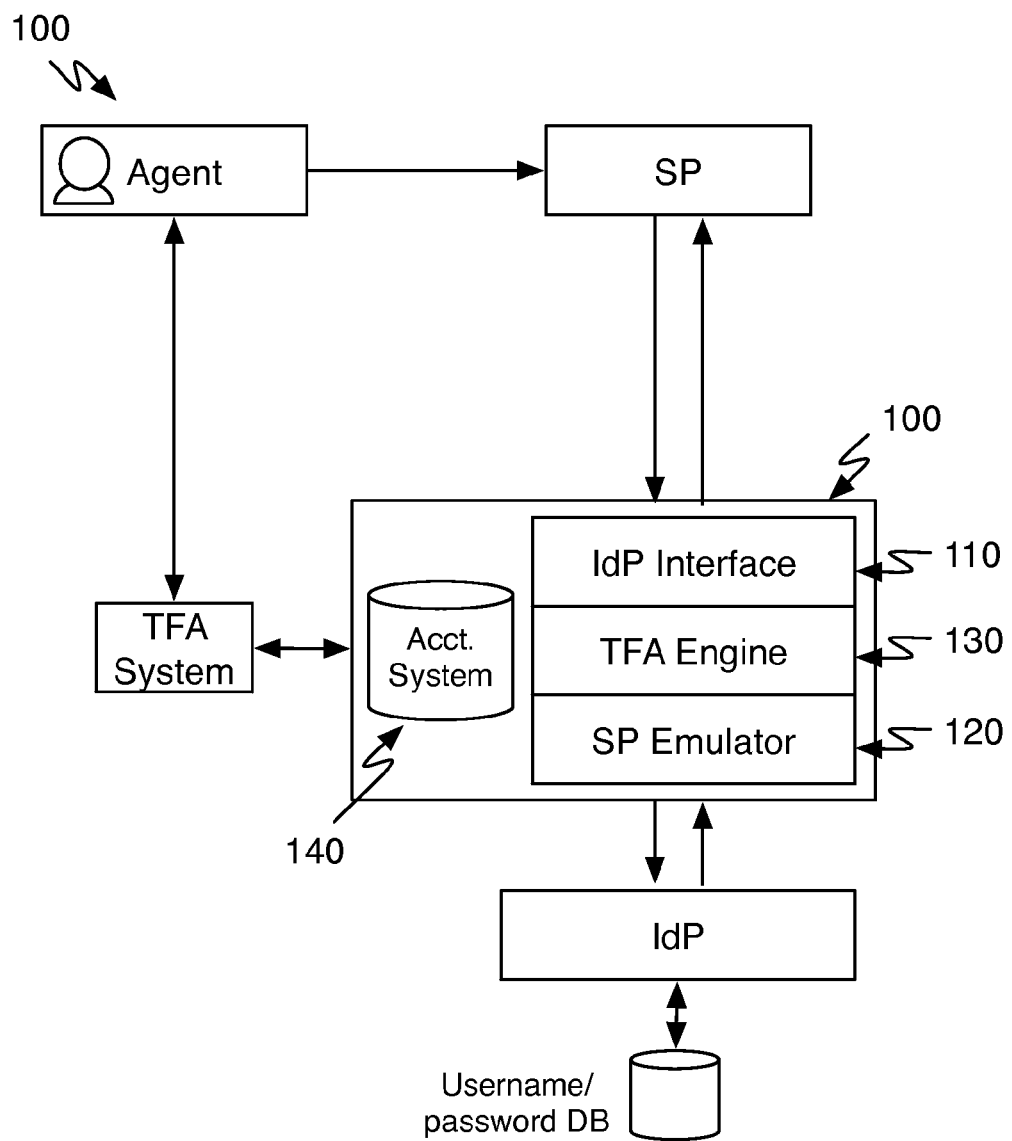
FIG. 1 is a schematic representation of a system of a preferred embodiment.

As shown in FIG. 1, a system of a preferred embodiment can include a federated authentication proxy system 100 comprising an identity provider (IdP) interface 110 a service provider (SP) emulator 120 and secondary-layer authentication engine 130. The system 100 can be used to implement a SAML proxy 102, an OpenID Connect (OIDC) proxy 104, a federated authentication translation proxy 106, a multi-authentication service proxy 108, and/or any suitable proxy for identity assertion service. The system functions to enable existing authentication delegation implementations to leverage additional factors of security. For example, SAML delegations and OpenID connect implementations can leverage the system 100 in integrating at least a second factor of authentication. The system is preferably used to add a two-factor authentication component on top of the identity security of an IdP. Furthermore, the system can be added nearly transparently without re-architecting the service provider system or the IdP system. In alternative embodiments, the federated authentication proxy system 100 can be used to implement an access control proxy 109.

Figure 2:
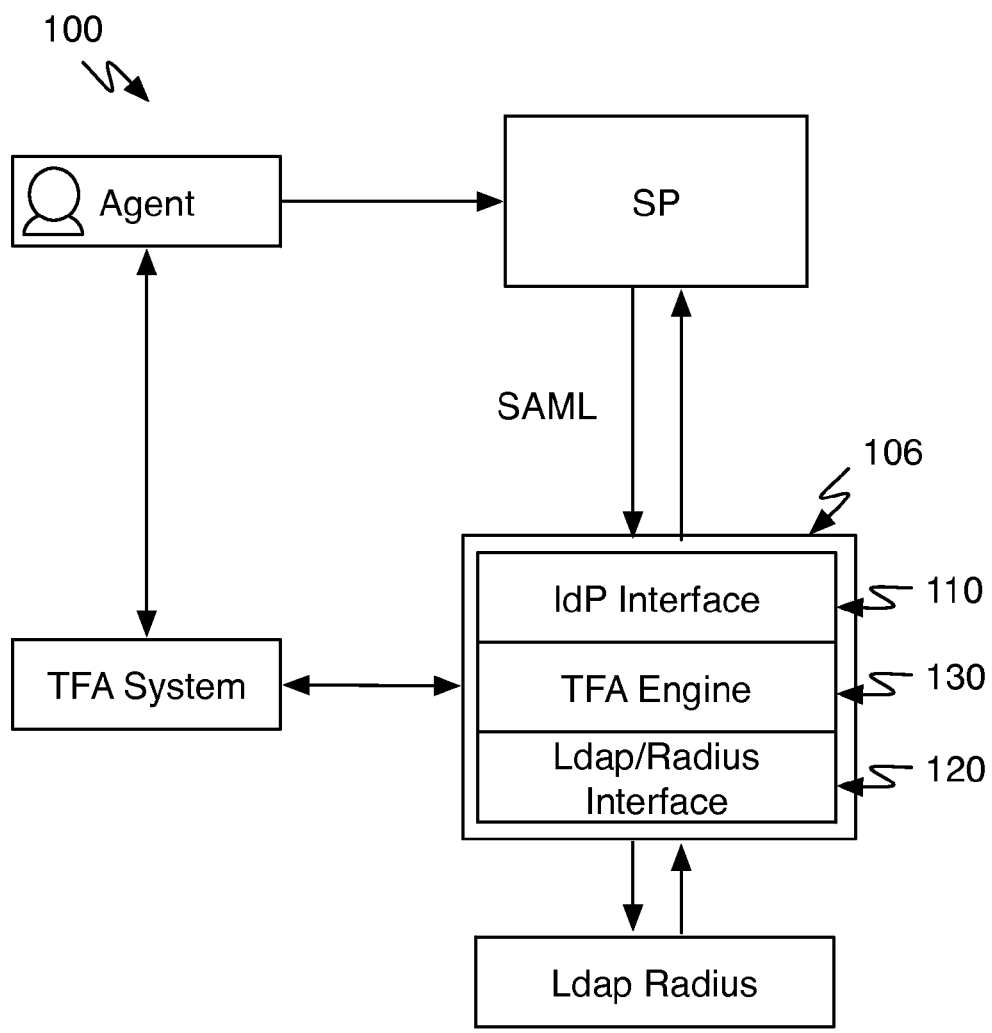
FIG. 2 is a schematic representation of a system of an alternative embodiment addressing a service provider with a LDAP/RADIUS backend through a translation proxy.

As shown in FIG. 2, the system may additionally or alternatively be implemented to add additional factors of security to SP even with IdPs that do not support the protocol of the SP. For example, the system may be used so that a company that has a LDAP/RADIUS backend may use the system to use that identity provider for a service that supports SAML (e.g., a federated authentication translation proxy 106). Herein, the preferred embodiment of SAML proxying for an IdP and an alternative embodiment of OpenID connect proxying for an OpenID connect provider (i.e., an OP) is used, but in alternative embodiments any suitable authentication provider may be proxied. A principal entity (e.g., an enterprise company, a web/application service, service provider, etc.) preferably elects to use the system to add the secondary-layer of authentication. A principal entity will preferably have a plurality of user accounts that may use the system in attempting to access a SP associated with the principal entity through a user agent. The system may be implemented as a cloud hosted service used by a plurality of entities. For example, the system may be a multitenant service platform composed of a plurality of federated authentication proxy systems 100. Alternatively, the system may be implemented as a private proxy for a single entity, and the system may additionally be hosted within an internal network as an on-premise system solution. The system may be used in combination with a second layer authentication system/service such as a two-factor authentication system, but may alternatively be integrated with an outside second layer authentication system/service or any suitable secondary authentication system.

The federated authentication proxy system 100 of the preferred embodiment is a network accessible resource that interfaces with a service provider, an IdP, two-factor authentication transactions, and a user agent. The federated authentication proxy system 100 may be configured to run on a server, a cluster of servers, a distributed computing system or any suitable network accessible computing infrastructure. The federated authentication proxy system 100 can be a cloud hosted or externally hosted component, but the federated authentication proxy system 100 can alternatively be an on-premise component operating on machines controlled a SP or at least within a local network of the SP. The proxy system 100 additionally includes any suitable databases, load balancers, processors, or components. The SAML preferably includes an account system such that a principal entity may configure at least one IdP to be used when a corresponding user account makes an access request of a service provider.

Figure 3:
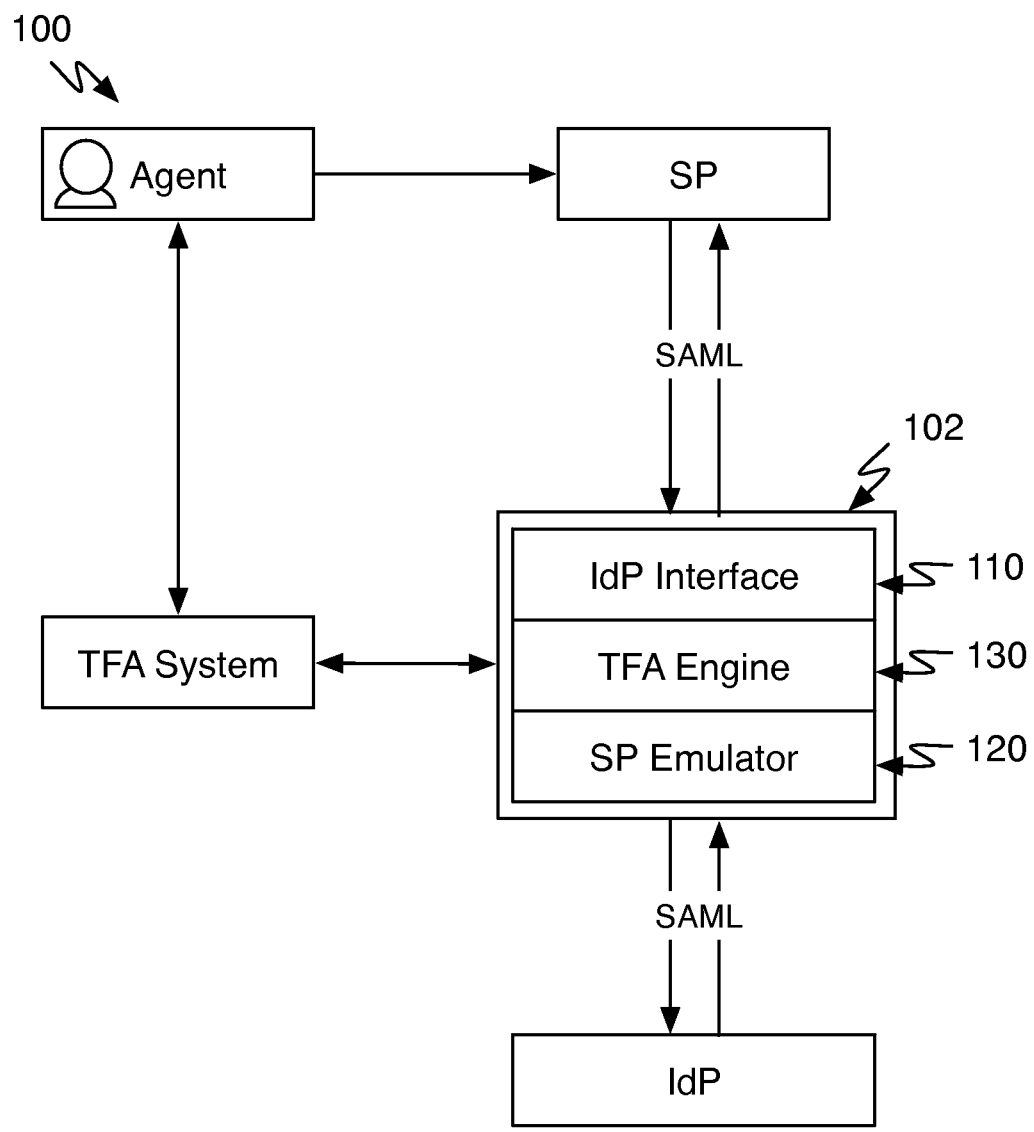
FIG. 3 is a schematic representation of a variation of a preferred embodiment with a SAML proxy.

In one variation, the federated authentication proxy system 100 is a SAML proxy 102, as shown in FIG. 3. A SAML proxy 102 functions to proxy as the IdP for a SAML integration of a SP. Many SPs may have existing infrastructure that depend on SAML based IdPs. The SAML based SP will include IdP addressing configuration for a particular account or system instance. The federated authentication proxy 100 can include different sets of certificates and addressing configurations to manage frontend (e.g., SP facing) and backend (e.g., IdP facing) legs of the process. The SAML proxy 102 addressing configuration can include an IdP URI parameter, an IdP certificate/token, attribute mappings, and/or other suitable settings. The addressing configuration can be updated to direct identity requests to the SAML proxy. The SAML proxy can similarly include IdP addressing configuration in the SP emulator 120, which is preferably set to properties of the original IdP previously used by the SP (or otherwise intended as an eventual identity provider). This can include setting/registering the SP emulator 120 of the SAML proxy as the SP for the IdP. The federated authentication protocol used between the SP and the SAML proxy 102 and between the SAML proxy 102 and the IdP is preferably SAML. Other variations of the proxy system 100 can similarly use SAML on at least one leg of the SP, proxy, and IdP network such as in the federated authentication translation proxy 106.

Figure 4:
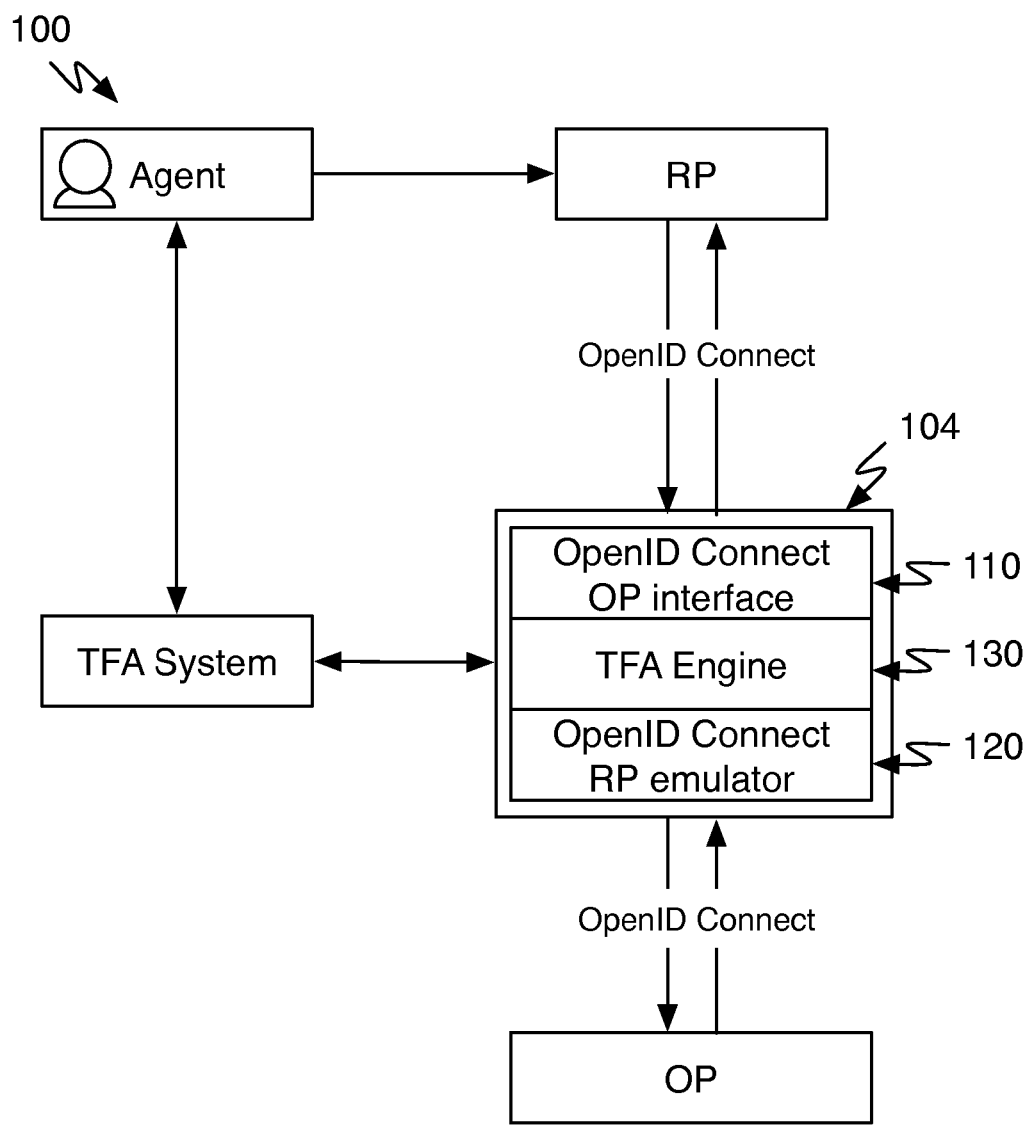
FIG. 4 is a schematic representation of a variation of a preferred embodiment with an OpenID Connect proxy.

In another preferred variation, the federated authentication proxy system 100 is an OpenID Connect proxy 104 as shown in FIG. 4. The OpenID Connect proxy functions to proxy as the OpenID Connect Provider (OP) for an OpenID Connect integration of an OpenID Connect relying party (RP). An OP is understood to substantially parallel the components of an IdP in the SAML variation, a RP is understood to substantially parallel the components of SP. Herein, use of SP and IdP will be readily understood to respectively describe an RP and an OP by one skilled in the art.

Similar to how the SAML configuration is set up to integrate the SAML proxy as an intermediary component in an SP-IdP authentication network, the OpenID Connect proxy 104 is preferably an intermediary component in the RP-OP authentication network. OpenID Connect integration with a service provider can include registering the SP emulator 120 with the OP. A URI of the OpenID Connect proxy (e.g., a URI of the service provider emulator endpoint) can be set in the OP. The OP may provide a client ID and a client secret certificate/token as well as an authorize endpoint URI, token endpoint URI, and a user info endpoint URI. Similar properties are then set in the OpenID Connect proxy 104 to configure the SP emulator 120 using Within the IdP interface 110 of the OpenID Connect proxy 104 similar configurable attributes can be provided such that properties provided by the RP can be entered in the proxy such that the RP uses the OpenID Connect proxy 104 as an OP.

Figure 5:
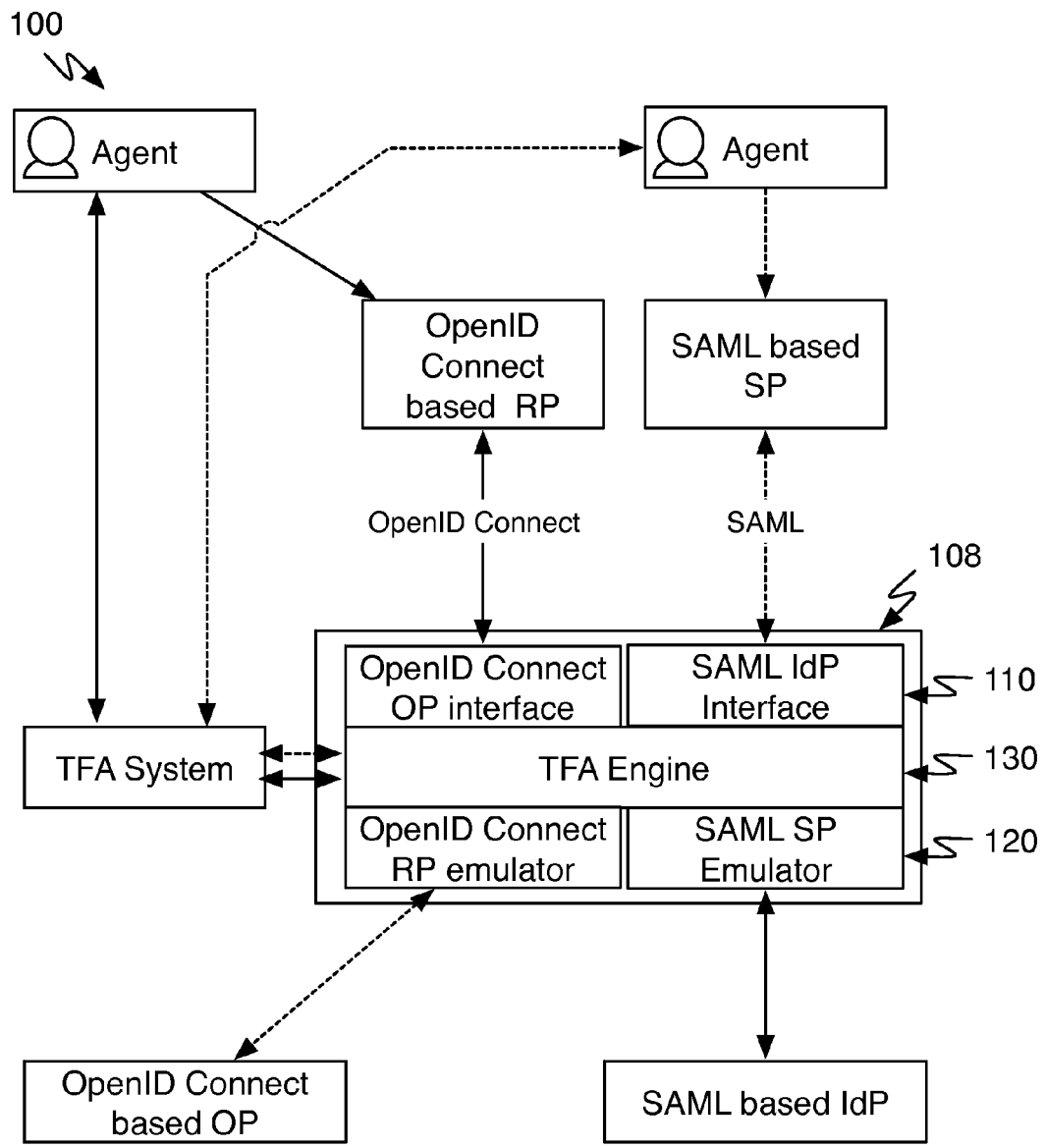
FIG. 5 is a schematic representation of a variation of a preferred embodiment with a multi-authentication proxy server.

In another variation, the federated authentication proxy system 100 can be a general purpose multi-protocol system that functions to proxy and optionally translate between a variety of federated authentication protocols. The SP protocol can be automatically detected and relayed, converted, or translated for an external IdP. A service provider could be SAML based, OpenID Connect based, or based on any suitable federated authentication protocol. And similarly, an IdP could be SAML based, OpenID Connect based, or based on any suitable federated authentication protocol. The SP and the IdP can use different protocols as shown in the multi-authentication service proxy 108 variation in FIG. 5. And multiple SPs can depend on a single IdP solution. In other variations, a federated authentication translation proxy 106 translates from one type of SP protocol to one type of IdP protocol as shown in FIG. 2.

The IdP interface 110 of the preferred embodiment functions to simulate an authentication provider of the service provider. A service provider can preferably be configured to communicate with the IdP interface 110 in place of an existing IdP. As mentioned above, the SP may alternatively use other authentication providers, in which case the IdP interface 110 and the proxy system 100 preferably proxies as a compatibility layer for the associated authentication provider (e.g., LDAP/RADIUS). From the point of view of the SP, the proxy system 100 can appear as a standard authentication provider. The IdP interface 110 is preferably integrated within the proxy system 100, but the IdP interface 110 may alternatively be a component communicatively coupled to the proxy system 100. The IdP interface 110 manages communication with the SP, receiving SP identity requests and transmitting assertions. The assertions to the SP will preferably be based on the combined assertions of the IdP (i.e., the authentication provider) and at least the second factor of authentication.

IdP (or an OP in the variation of OpenID Connect) or more generally an authentication provider can depend on various attributes (as in SAML) or scopes (as in OpenID Connect). These attributes can be detected and automatically translated for use with the protocol of the intended IdP. These attributes are preferably passed into the IdP interface 110, translated or reformatted, and delivered through the SP emulator 120. The system can include automatic protocol detector that uses attributes and protocol communications to automatically select and engage different forms of protocols of the SP and/or the SP.

The SP emulator 120 of the preferred embodiment functions to simulate the requesting SP to an outside IdP. The SP emulator 120 may use the SP identity requests received by the IdP interface 110. Alternatively, the SP emulator may process, modify, supplement, generate or augment SP identity requests sent to the IdP. The IdP will preferably perform the regular authentication process since the emulation of a SP by the SAML proxy is preferably substantially transparent to the IdP. As described above, the SP emulator may additionally or alternatively be configured to interface with other types of authentication providers such as LDAP/RADIUS systems.

The secondary-layer authentication engine 130 of the preferred embodiment functions to facilitate a second factor of authentication. The secondary-layer authentication engine 130 may be an implementation of two-factor authentication (TFA), but alternatively, the secondary-layer authentication engine 130 may be an interface to a two-factor authentication service or other service for an additional factor of authentication. The SAML proxy 102 may additionally include any suitable number of additional factors of authentication. There can be an authorization layer, a secondary device factor of authentication, a biosecurity factor of authentication, an informational challenge layer, a permissions layer, or any suitable additional layer of authentication or authorization to supplement the services of the IdP. The secondary-layer authentication engine 130 can be executed in parallel to IdP, but may alternatively be sequence (e.g., as an initial stage before IdP or as a follow up stage after use of the IdP). The SAML proxy 102 may additionally be configured to use any suitable logic to direct the use of additional authentication factors. For example, some requests may be processed with one form of two-factor authentication, and other types of requests may be processed with a second form of two-factor authentication.

Figure 6:
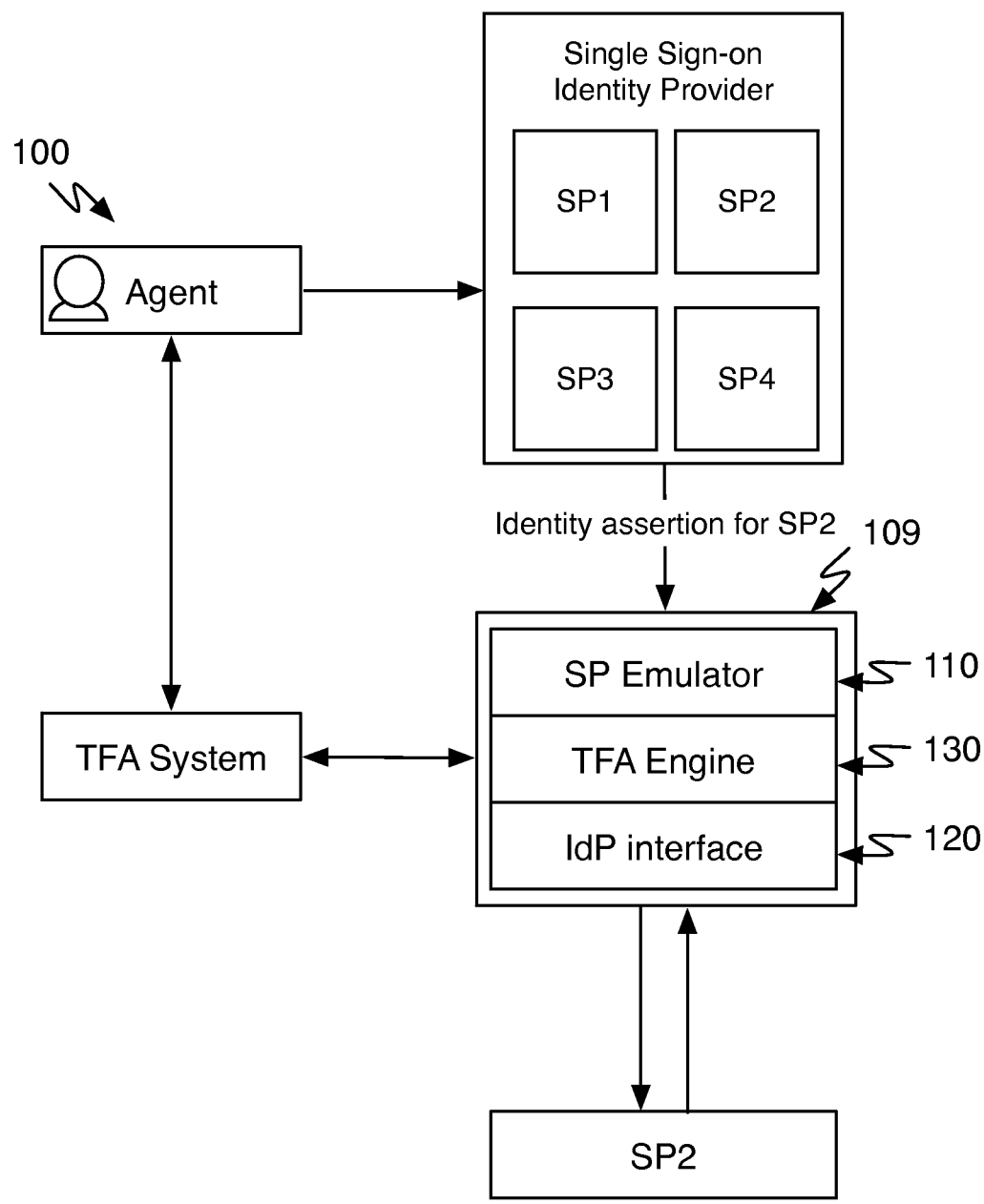
FIG. 6 is a schematic representation of a system of a second a preferred embodiment for single sign-on applications.

The system is preferably configured such that authentication requests are initiated by the service provider. As an alternative or additional configuration, the system can be integrated in a system architecture where an authentication assertion is initiated by the IdP entity. For example, single-sign on systems can function as an interface to an IdP like service, but instead of pushing an authentication to an external IdP, the single-sign on system can generate an authentication assertion and then publish the assertion to one or more service providers through an access control proxy 109 as shown in FIG. 6.

The system can additionally include an account system 140 that includes account databases and records to coordinate multi-tenant use of the services of a proxy service. The account system manages different SP, IdP, and/or secondary layer of authentication configuration. In one exemplary implementation, a plurality of proxy systems 100 can be implemented with a loadbalancer or other suitable work distributor. The authentication requests (and similarly any authentication assertions) can be distributed to different proxy server instances, which functions to allow multiple different service providers to use the system for different customized types of authentication. General IdP interfaces 110 (e.g., one URI) can be used, wherein authentication requests are processed according to account instance identifier attributes submitted in a request. Alternatively, individually assigned IdP interfaces can be used to further distinguish between authentication requests of different service providers.

2. Method for Proxying Authentication Providers

Figure 7:
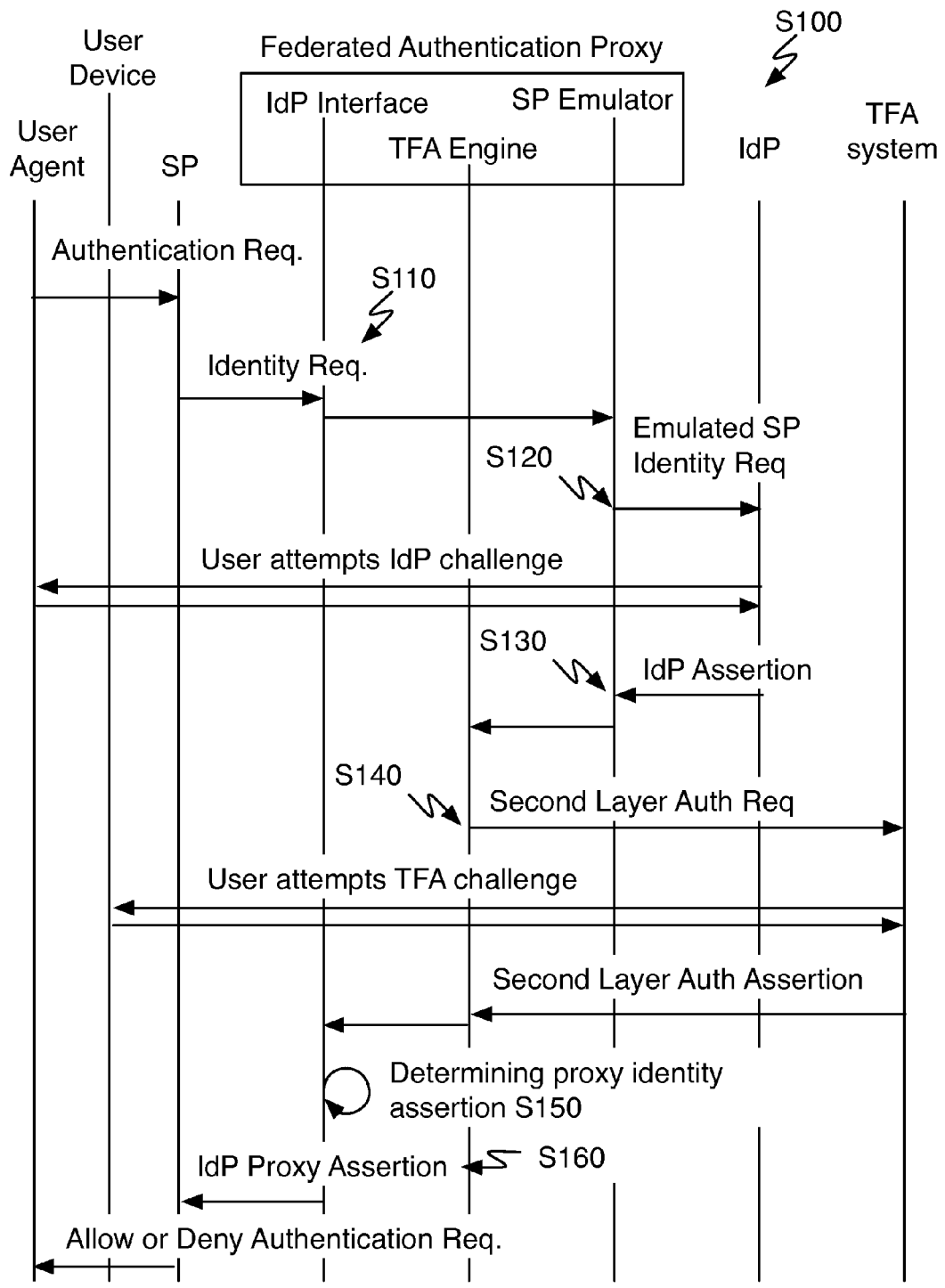
FIG. 7 is a sequential communication diagram of a method of a preferred embodiment.
Figure 8:
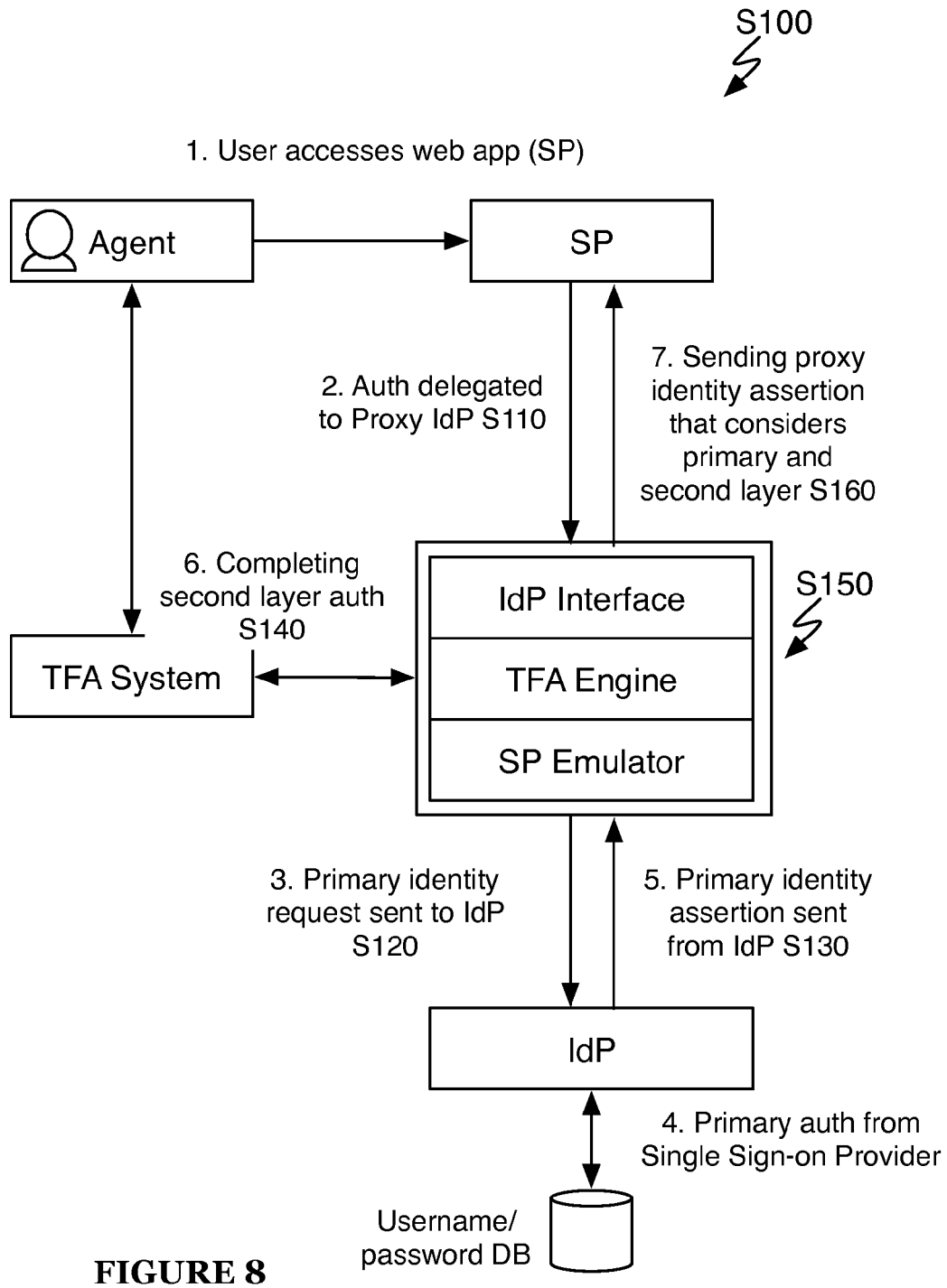
FIG. 8 is a schematic representation of a method of a preferred embodiment.

As shown in FIGS. 7 and 8, a method of a preferred embodiment can include receiving a service provider (SP) identity request through an identity provider interface S110; transmitting a proxy identity request to a configured identity provider (IdP) through an SP emulator S120; receiving an identity assertion S130; performing a second layer of authentication S140; determining a proxy identity assertion from the identity assertion and results of the second layer of authentication S150; and transmitting a proxy identity assertion to the service provider S160. The method functions to provide additional forms of authentication within federated authentication protocol solutions. In one preferred implementation of the method, the method functions to perform SAML authentication and/or authorization delegation in combination with two-factor authentication. The use of a federated authentication proxy is preferably transparent to the SP and to the IdP. The operation of the federated authentication proxy service preferably simulates an IdP from the viewpoint of an SP and simulates an SP from the viewpoint of an IdP. In alternative embodiments, the method may be implemented for proxying other types authentication providers. For example, the method may additionally or alternatively be extended to use an IdP that has a LDAP/RADIUS backend instead of an SAML. In such an alternative, the federated authentication proxy preferably proxies for the appropriate authentication provider and emulates SP communication to the alternative authentication provider. The method can additionally be applied to OpenID Connect federated authentication implementations or any suitable type of federated authentication.

As described above, a federated authentication proxy is preferably employed when a principal entity (e.g., an enterprise with a plurality of employees using a service) wants to enable a second layer of authentication and/or authorization security on top of an existing IdP. The principal entity (i.e., the managing account") preferably configures federated authentication proxy settings of an SP to use a URI (or other suitable identifier) of the IdP interface of the federated authentication proxy service. Additionally, the principal entity can configure the federated authentication proxy service with an IdP. For example, Company A will set the SAML delegation URI field in a Sales Service Provider from a previous setting of idp.example.com to idp-proxy.duosecurity.com, and configure account settings of the SAML proxy to use idp.example.com and a two-factor authentication service. In such an exemplary use-case scenario, the principal entity can use existing IdP systems while adding additional authentication and authorization security through use of the SAML proxy. Other variations of federated authentication proxy solutions can similarly be implemented such as an OpenID Connect proxy.

Figure 9:
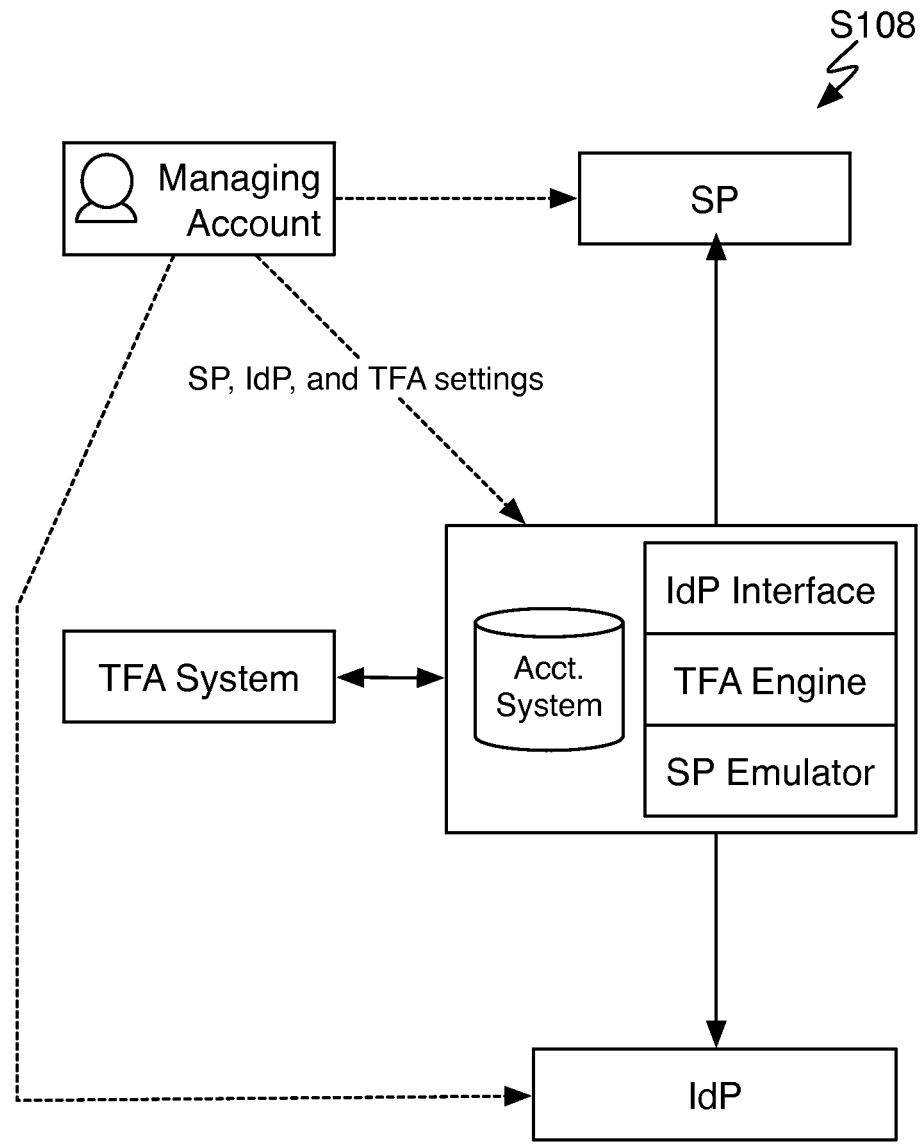
FIG. 9 is a schematic representation of configuring a managing account instance

The method can include configuring a managing account instance with SP configuration, secondary layer authentication configuration and/or IdP configuration S108, which functions to set a federated authentication proxy to setup an IdP, a two-factor authentication system or service, an SP, and/or any suitable settings of the proxy. Configuring the managing account instance can include providing an administration interface to the federated authentication proxy server service. Each entity preferably configures use of the federated authentication proxy at least partially through account settings as shown in FIG. 9. In configuring a SAML-based IdP, an entity or a managing account preferably provides the IdP identifier (e.g., a URL) in a manner that is substantially similar to configuring the IdP of the SP. IdPs and additional factors of authentication may be configured with customized authentication flow logic to determine how authentication should be performed. OpenID Connect and other federated authentication protocols may similarly be set up as appropriate for the protocol. There is preferably a SP configuration leg and an IdP configuration leg. The SP configuration leg defines parameters and settings for the SP to use the federated authentication proxy. The IdP configuration leg defines parameters and settings for the federated authentication proxy to simulate an SP using the IdP. The setup of authentication and/or authorization may use a variety of security flows based on the services and/or features desired by the principal entity. For example, two optional IdPs may be configured and prior to a user agent being redirected to an IdP the user agent is allowed to select a preferred IdP.

The SP configuration is provided through the administration interface (i.e., a control panel) such that an account user of the SP can set up their SP account to use the proxy server as a federated authentication proxy server. The IdP configuration is provided through the administration interface such that the account user can additionally configure the proxy server to simulate a service provider to a selected IdP.

Providing the administration interface can additionally include providing an automatic configuration interface, wherein the SP and/or the IdP are automatically configured by authenticating with the SP and/or the IdP in an administrator control panel of the proxy service. In one variation, read/write privileges of the existing IdP settings in the SP and/or IdP can be granted to the proxy service. If the SP exposes an API for setting of the IdP service, the system of the federated authentication proxy may programmatically set the federated authentication proxy as the IdP service. The existing configuration are accessed to determine the original SP and IdP setup; then the configuration settings are modified to splice the authentication proxy server as an intermediary authentication node that supplements federated authentication with an additional layer of authentication. Alternatively, a user can select the SP and the IdP, authenticate with both services, and the settings are modified based on the selection.

In one preferred implementation, the federated authentication proxy is used as a multitenant federated authentication proxy shared by a plurality of entities. Each entity may additionally be configured for individually configured IdP services and/or two-factor or alternative authentication/authorization. Preferably, an IdP interface URI that is unique to each entity account may be provided to the respective entity. In that way, when an SP makes requests to the federated authentication proxy server, the federated authentication proxy server can determine which entity account and/or IdP configuration to use. An entity account may additionally include a plurality of proxy settings for various service providers. In an alternative implementation, the SAML proxy is a service component or components operating within an internal network of a principal entity as an on-premise solution.

In one preferred implementation, the federated authentication proxy is provided in combination with a two-factor authentication service. The settings of an existing two-factor authentication system may be applied to account settings of the federated authentication proxy. In an alternative implementation, configuring a two-factor authentication service may include receiving two-factor authentication account credentials.

Step S110, which includes receiving a service provider (SP) identity request through an identity provider interface, functions to emulate an IdP during execution of the authentication protocol from the perspective of the SP. The SP will preferably be configured to communicate with the federated authentication proxy. The SP will preferably identify an identifier of the federated authentication proxy when identifying a preferred IdP of a user agent, and redirect the user agent to the federated authentication proxy. The identifier of the federated authentication proxy is preferably a URI and more preferably a URL, but may be any suitable identifier. Communication to the URL is preferably retrieved and managed by the IdP interface of the federated authentication proxy. The SP will preferably be anticipating an IdP assertion response according to the federated authentication protocol. An SP configured to use a SAML based IdP will use the SAML protocol. An SP configured to use OpenID Connect will follow the OpenID Connect communication protocol. Upon initially receiving the SP authentication request the federated authentication proxy initiates a process of submitting the request to an IdP and conditionally performing a second-factor of authentication.

Step S120, which includes transmitting a proxy identity request to a configured identity provider (IdP) through a SP emulator, functions to convert the identity request of the SP to be a proxy identity request from the federated authentication proxy to the IdP. From the perspective of the IdP, the federated authentication proxy is a SP. Blocks S120 and S130, which function to retrieve an identity assertion from an IdP, include emulating a service provider in a second instance of a federated authentication protocol when transmitting, receiving, or performing other stages of the authentication protocol. When initiating communication (e.g., transmitting the proxy identity request), an appropriate IdP and configuration is selected. The selection of the IdP is preferably based on the identifying properties of the identity request from the SP. An identifier. In one variation, a unique URI is given to the SP to be used for a particular managing account instance.

Figure 10:
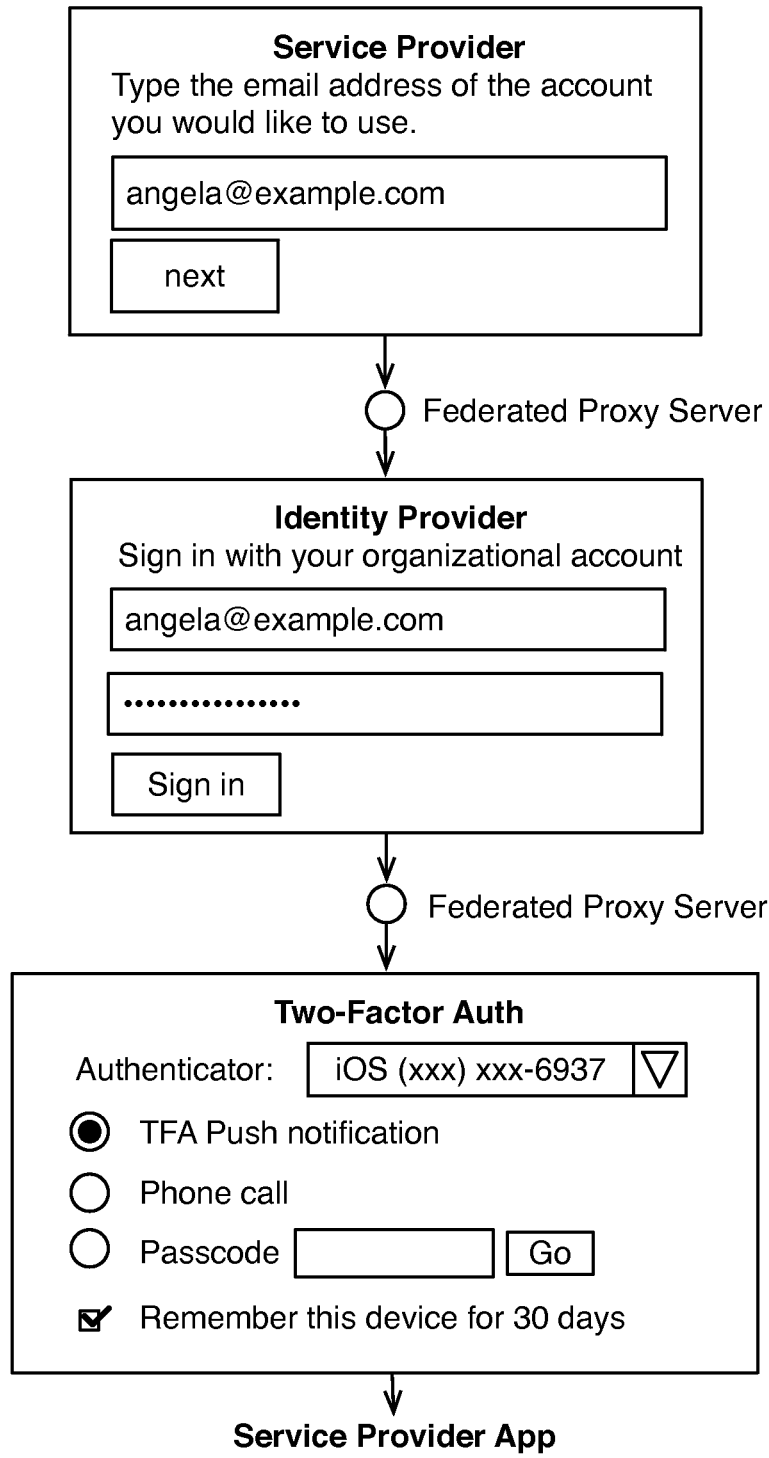
FIG. 10 is a schematic representation of an exemplary user flow established through the federated proxy server.
Figure 11A:
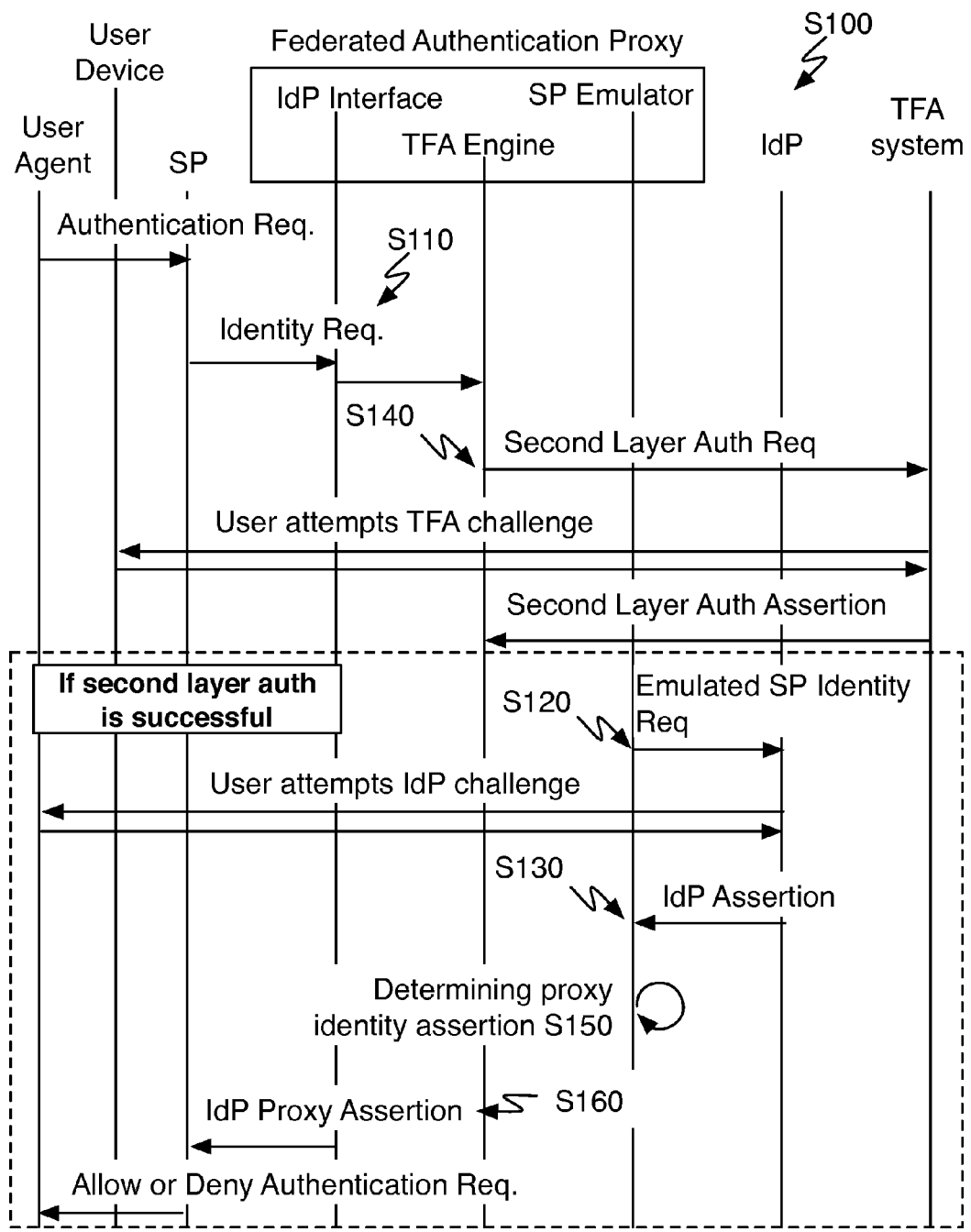
FIGS. 11A and 11B is a sequential communication diagram of a variation of conditional ordering of a method of a preferred embodiment.
Figure 11B:
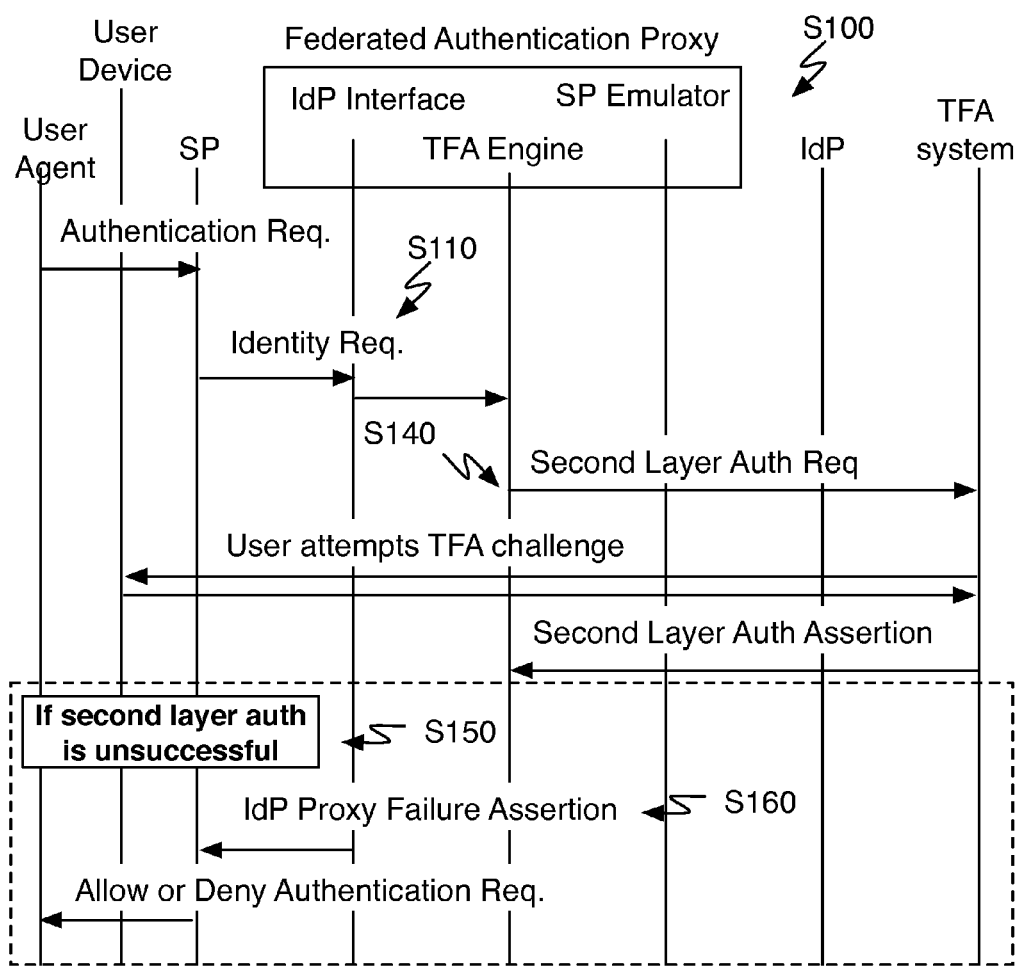
Figure 12:
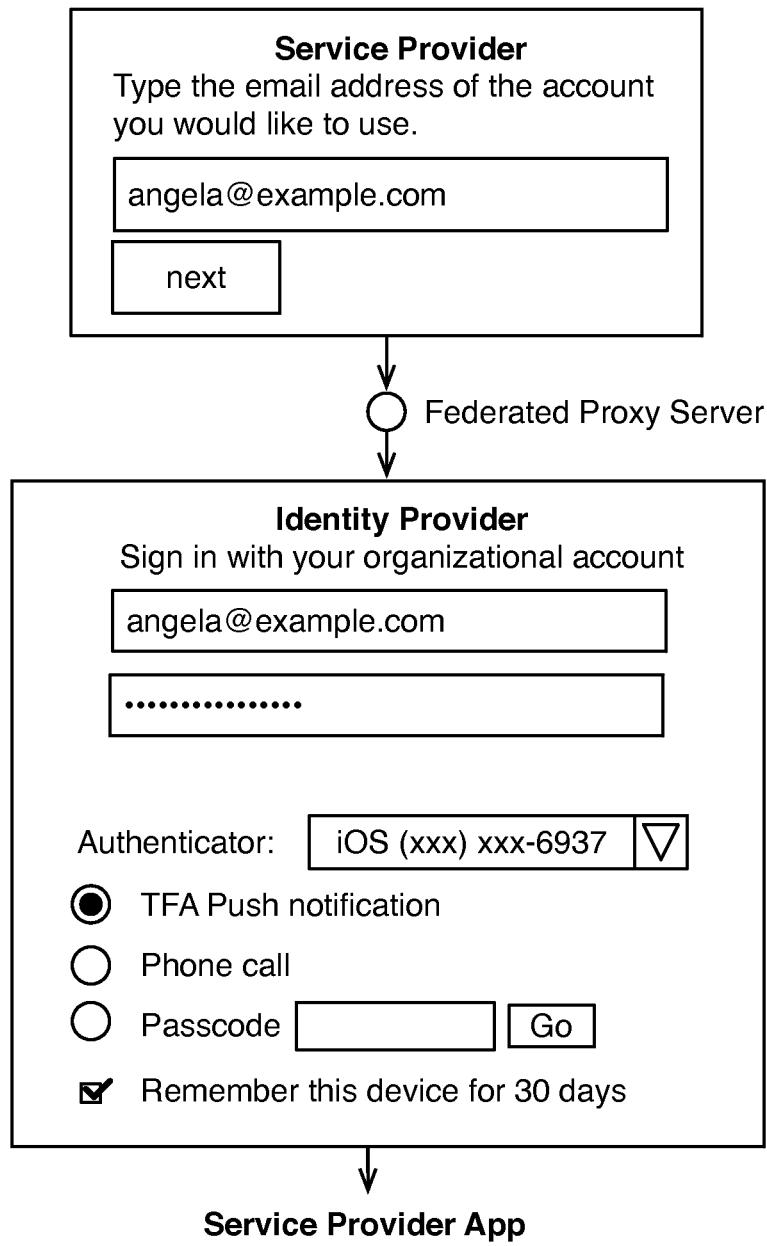
FIG. 12 is a schematic representation of an exemplary user flow established through the federated proxy server.

Preferably, a user agent that had been directed to the federated authentication proxy in Step S110 will be subsequently redirected to the configured IdP. The redirection to the IdP can be transparent such that the user experiences the SP simply directing to the IdP as shown in FIG. 10. This variation preferably includes the second layer of authentication happening sequentially after completing authentication with the IdP as shown in FIG. 7. In another variation, the federated authentication proxy transmits the proxy identity subsequent to and conditional upon successful authentication with the secondary layer of authentication as shown in FIGS. 11A and 11B. This variation preferably includes the second layer of authentication occurring sequentially before engaging the IdP. In another variation, the transmitting of a proxy identity request to a configured IdP through a SP emulator is performed in combination or in parallel with a second layer of authentication. In one variation, the parallel execution of the primary identity authentication and the secondary layer authentication can be appear as a single process to a user, as shown in FIG. 12.

In one preferred implementation, the SP and the IdP use common federated authentication protocols. In alternative implementations, the second instance of the authentication protocol is a different protocol, and the SP emulator (or another suitable component) translates from an authentication protocol of the SP to an authentication protocol or the IdP. For example, a SAML based SP can use an OpenID Connect based IdP. Similarly, the converse can occur for translating from an OpenID Connect protocol to a SAML protocol. The translation can be automatically invoked based on the configuration of the SP and/or the IdP. Translation between SAML and OpenID Connect can include translation between attributes of SAML and scope properties of OpenID. In one implementation a table of attribute mappings can be maintained that provide attribute translation patterns between the protocols. One exemplary mapping could translate based on an attribute name (e.g., OIDC "given_name" vs SAML "givenName"). Translation can additionally occur on attribute values. For example, the OIDC address attribute can be changed to a JSON structured object. Additionally differents in the format of the protocols spoken (e.g., between SAML and OIDC), translation of attribute envelope/messages can further be used (e.g., JSON claims in OIDC vs XML in SAML).

The IdP preferably performs the identity authentication and/or authorization of the IdP. In one variation, the IdP collects username and password information, which can be validated by the IdP. The IdP preferably includes user/account databases that can be used to authenticate credentials and then perform any suitable signing or cryptographic procedures to assert valid authentication back to the SP. The assertion of the IdP (successful or unsuccessful) is then transmitted back to the configured SP of the IdP (in this leg of communication the configured SP of the IdP is the service provider emulator of the federated authentication proxy server). The federated authentication proxy is preferably agnostic to the operational details of the IdP as the IdP is preferably an outside service selected and controlled by a principal entity. In one preferred implementation, the federated authentication proxy server and the IdP are established within a firewall of an internal network, such that username/password credentials or any suitable credentials are not exposed to the external network. In an alternative embodiment, the IdP may be any suitable alternative service capable of performing identity verification and responding with some form of identity assertion such as a LDAP/RADIUS system, OpenID Connect, and the like.

Step S130, which includes receiving an identity assertion, functions to receive the primary stage/layer of identity assertion provided by an IdP. In the case of SAML, the IdP preferably responds with an XHTML form response including a SAML response parameter. The identity assertion of the IdP preferably indicates if the identity was successfully authenticated and/or authorized. If the identity assertion indicated the IdP successfully validated the request, then the federated authentication proxy preferably proceeds to block S140. If the identity assertion indicated the IdP denied or unsuccessfully validated the identity request, then S140 may be optionally skipped and the failed assertion is transmitted to the SP as in block S160. The transmission preferably indicates that the identity request failed to be validated. Block S140 can still be implemented in a modified form such as to notify the user of the failed attempt through a secondary device used in two-factor authentication. In an alternative variation, the second layer of authentication is initially completed, and the end assertion result depends on the identity assertion of the IdP. Alternatively, block S140 and block S130 may be performed in parallel as described above.

Step S140, which includes performing a second layer of authentication, functions to execute and insert an additional factor of authentication, authorization, and/or identity security into the identity authentication process. The second layer of authentication is preferably a form of two-factor authentication through a registered device of the identity authenticated. Performing two-factor authentication will preferably include receiving verifying credentials such as a knowledge factor (e.g., something the user knows), a possession factor (e.g., something the user has), and/or an inherence factor (e.g., something the user is). Additional layers of authentication (preferably of different variations) can additionally be performed. Preferably, performing two-factor authentication includes verifying a possession factor by transmitting an authentication message to a user device. The authentication message in one variation will include interactive response capabilities to confirm, ignore, cancel, and/or perform any suitable authentication response. The authentication message in a second variation will transmit a code. In this variation, the user agent is preferably directed to an interface to enter and confirm receipt of the code. The interface is preferably presented through an interface enabled through the IdP interface of the federated authentication proxy by simulating an interface of the IdP. The interface may alternatively be presented in an alternative destination such as an accompanying application on a mobile computing device, the web, or other suitable destination. The two factor authentication may alternatively be performed in any suitable manner, such as by confirming a disconnected token, a connected token, single-use password, biometric reading, location information, or any suitable form of two-factor authentication. In an alternative variation, a two-factor authentication service is messaged with appropriate identifiers of the user/account/entity attempting to authenticate. Alternatively, the second factor identity security may be configured for authorization. For example, a permissions service may be used to check authorization of the requested action or a second user may be messaged and/or prompted to authorize the identity request. The method may include the process of performing the at least second factor of authentication/authorization, but alternatively, the SAML proxy may interface with an outside service used as the second factor of authentication.

Figure 13:
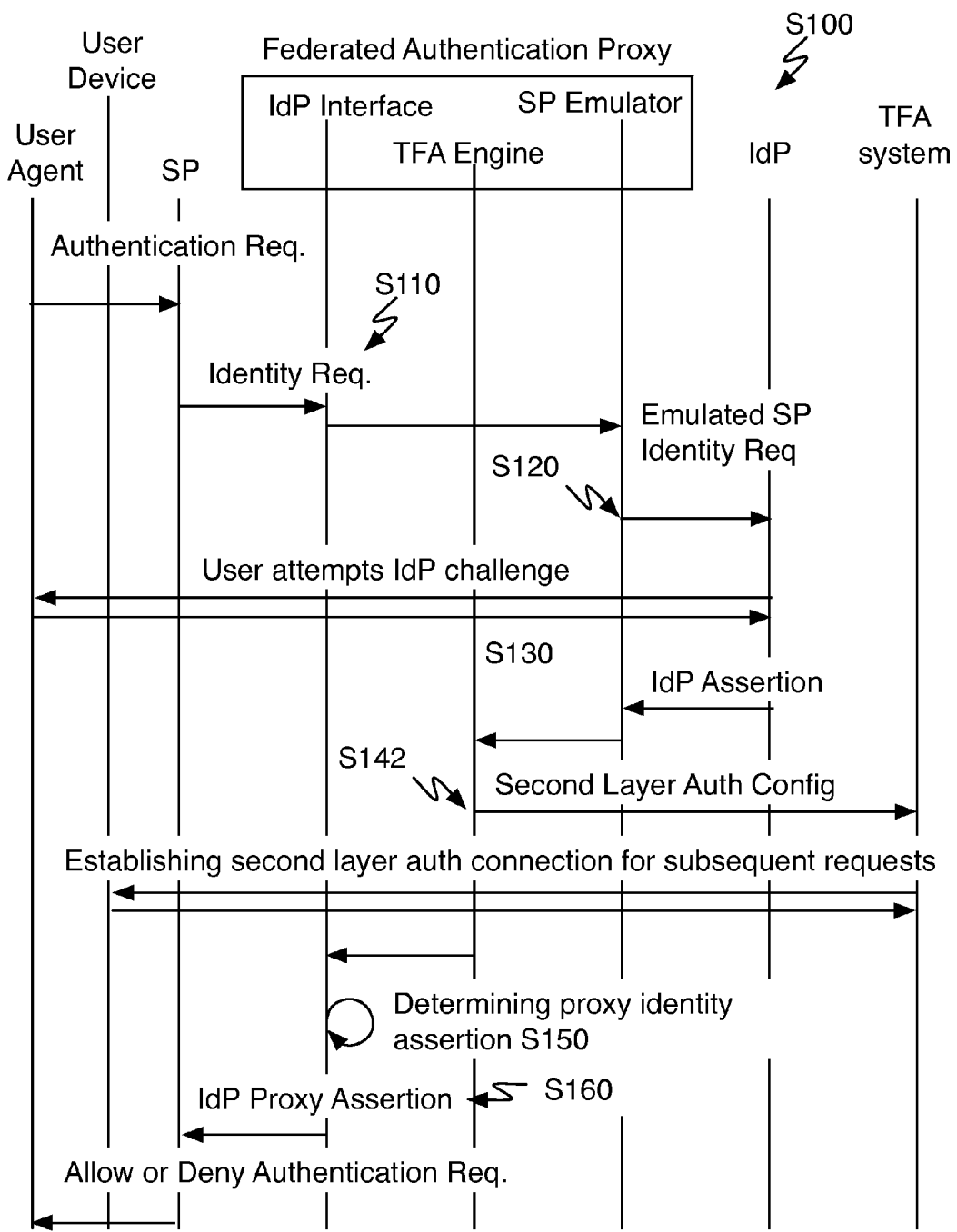
FIG. 13 is a sequential communication diagram of a variation of setting second layer authentication.

Prior to performing the second layer of authentication, the method can include setting second layer of authentication properties of a user identity S142, which functions to set up the user for executing the two-factor authentication or other suitable form of additional layers of authentication as shown in FIG. 13. The authentication properties could include an endpoint address of an authenticating device (e.g., a phone number, or an application instance identifier for push notifications or app messaging), answers to a set of security questions, a set of biometric samples, synchronization of one-time password tokens, synchronization of a or any suitable properties used to later verify authentication properties.

The federated authentication proxy preferably maintains a record of second layer authentication properties for a given identity and a given managing account. When an identity request comes in, a unique identifier of the identity in question is preferably used to access and select the corresponding second layer authentication properties, which are used in executing the second layer of authentication. The managing account is preferably established by the entity configuring the SP, the proxy server, and the IdP. For example, the managing account could be controlled by the IT department of an enterprise company that wants to use the SP and IdP for their employees. In this example, the employees would each have a user identity that may be authenticated. Each user identity that the managing account wants to authenticate with the additional factors of authentication provided by the federated authentication proxy server must be set with second layer authentication properties.

In one variation, an application programming interface (API), admin control portal interface, or any suitable interface provides a mechanism through which the managing account can set the properties for selected user identities. Additionally, the federated authentication proxy server can process identity requests differently depending on the status of user identity authentication properties when processing a corresponding identity request. In one implementation, only select user identities are configured with the second layer of authentication. Only identity requests for these users trigger use of the second layer of authentication; other user identity requests are processed only with the IdP. Alternatively, default authorization properties can be set so that any non-registered user identity request goes through a second layer of authorization by another entity. For example, the first time a user tries to authenticate in an SP, the IT department can be notified and asked to verify the identity request. This can provide a channel through which an IT department may efficiently enroll new user identities on demand without blocking access while a user waits for the second layer of authentication to be set up.

In another variation, the federated authentication proxy server can automatically initiate enrollment of a new user identity when authenticating a user without configured second layer authentication properties. When an identity authentication request is received, if the identity is not in the database of configured user identities, a prompt could be displayed for a user to set the authentication properties. The second layer of authentication is then subsequently dependent on the authentication properties set during the initial setting (or prior edits) of the properties. The identity request is still preferably verified by the IdP.

The result of the second layer of authentication is preferably collected, received, or obtained by the federated authentication proxy service. The second layer of authentication may alternatively be performed in parallel to the IdP identity validation of Steps S120 and S130. If the two-factor authentication determines the user is not authentic and/or authorized prior to a response from the IdP, then the SAML proxy may immediately proceed to Step S160, transmitting a proxy identity assertion that indicates the identity request failed to be validated, which parallels the alternative embodiment of Step S130.

Alternative or additional forms of authentication/authorization may be used in place of or in addition to the two-factor authentication. Herein the system and method uses two-factor authentication as the preferred form of secondary authentication/authentication service, but any suitable secondary authentication and/or service may be used, as one skilled in the art would appreciate. In one preferred embodiment, the federated authentication proxy is a component of the two-factor authentication service. With an integrated two-factor authentication service (or other suitable service of an additional authentication layer), the method can include the processes relating to the form of the second layer of authentication. For example, a two-factor authentication service preferably includes identifying a device endpoint mapped to the user identity, messaging the device endpoint, receiving authentication confirmation through messaging the device endpoint, and verifying authentication confirmation. The two-factor authentication can depend on user entry of a pincode transferred to the device endpoint, application confirmation with cryptographically secured verification, or any form of confirmation. In one implementation, the two-factor authentication uses push notifications as described in patent application Ser. No. 13/039,209 filed 2 Mar. 2011, which is hereby incorporated in its entirety by this reference.

Block S150, which includes determining a proxy identity assertion from the identity assertion and results of the second layer of authentication, functions to apply logic in determining the resulting assertion from the set of information including the identity assertion and results of the second layer of authentication. Since the federated authentication proxy preferably requires at least two forms/layers of identity validation, if either the IdP or the two-factor authentication fail to confirm that the identity request is indeed valid (authentic and/or authorized), then the response to the SP preferably reflects the invalidity of the identity request. A positive, confirmed, or verified proxy identity assertion is determined by the combination of a successful identity assertion and successful completion of the second layer of authentication. In one variation, the result of the IdP identity assertion is not inspected by the federated authentication proxy; the proxy identity assertion packages the result of the IdP identity assertion to be dependent on the success or failure of the second layer of authentication. In this variation, the SP will determine the identity assertion to be successful only if the assertion from the second layer of authentication is successful when the IdP had been successful. In an alternative embodiment, at least a second IdP may additionally be configured. Steps S120 and S130 may be repeated for each additional IdP configured for the principal entity. Similarly block S140 can be repeated for additional layers of authentication Step S160, which includes transmitting a proxy identity assertion to the service provider, functions to send a response to the initial request of the service provider. The federated authentication proxy preferably considers the identity assertion of the at least one IdP and the result of the two-factor authentication. Preferably, all forms of identity security (e.g., the identity assertion and the two-factor authentication) positively confirm, approve, or validate the request of the SP. In one alternative variation, if one of the security factors fails to adequately validate the request, then a subsequent security factor or security channel may be used. Similarly, the federated authentication proxy may be configured to trigger some outside response for particular security validation scenarios. For example, if the IdP validates the request and two-factor authentication does not, then the federated authentication proxy may trigger an account alert, send an email to an appropriate destination, alter account/user identity privileges or security measures, or perform any suitable action in addition to transmitting the proxy identity assertion to the service provider. In an alternative variation, the proxy identity assertion can be posted to a status resource. The status resource can be a URI where an encrypted assertion result can be accessed. The status resource is preferably used if and when the authentication protocol dictates that the SP polls the status resource for results.

Figure 14:
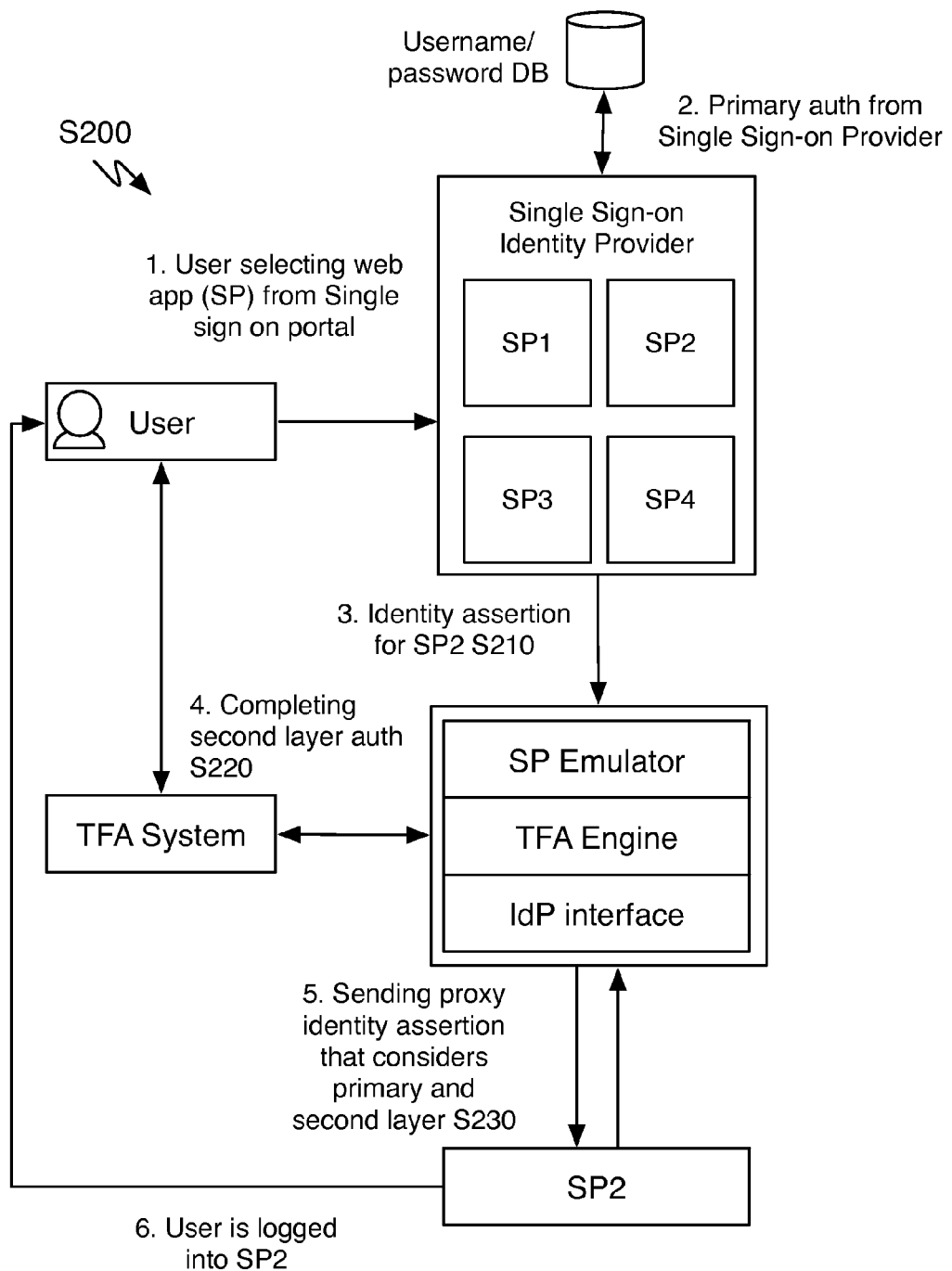

In an alternative embodiment, a method S200 for single sign-on proxying can include receiving an identity assertion of an identity provider through a federated identity protocol S210, facilitating execution of a second layer of authentication S220, and transmitting a proxy identity assertion to a service provider through a second instance of a federated authentication protocol comprising emulating an identity provider in the second instance of a federated authentication protocol S230 as shown in FIG. 14.

The method S200 can share substantial similarities to the variations and aspects of the method S100 above. However, S200 is preferably initiated by an identity assertion from an identity provider as opposed to the embodiment described above that preferably initiates in response to an identity request of a service provider. The method can include, in association with a managing account instance, configuring the first instance of a federated authentication protocol and the second instance of a federated authentication protocol; and prior to transmitting the proxy identity assertion, selecting the second instance according to an identifier of the managing account from the first instance in manner substantially similar to selecting an identity provider of a service provider in method S100. The second layer of authentication is preferably used as an additional check that must be determined to be successful before a positive identity assertion is delivered to the service provider. If the second layer of authentication is unsuccessful, the proxy server can return an error message to the identity provider, send an unsuccessful identity assertion to the service provider, ignore the identity assertion, the identity request, or perform any suitable action in response to an unsuccessful second layer authentication/authorization.

As in method S100, method S200 can be applied to a variety of protocols. As one example, a first party protocol of a single sign-on service can interface with the federated authentication proxy server. In another example, the IdP and/or the SP can user ADFS (active directory federation service) or any suitable claim-based access control authorization protocol. The method S200 can additionally include translating between federated authentication protocols. For example, when the protocol between the identity provider and the federated authentication proxy server (i.e., a first protocol instance) and the protocol between the federated authentication proxy server and a service provider (i.e., a second protocol instance), the method can include translating attributes between the first type of protocol and the second type of protocol.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the SAML proxy and/or two-factor security system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
at a proxy server:
responsive to a service provider identity request in accordance with a federated authentication protocol, determining a proxy identity assertion based on execution of a second layer of authentication, and
providing the determined proxy identity assertion to a service provider corresponding to the service provider identity request;
wherein the proxy server determines the proxy identity assertion based on execution of the second layer of authentication and based on an identity assertion obtained from an identity provider;
wherein the identity assertion is received responsive to the proxy server transmitting a proxy identity request to the identity provider;
wherein the service provider identity request is received from the service provider by emulating an identity provider in a first instance of a federated authentication protocol;
wherein the proxy identity request is transmitted by emulating a service provider in a second instance of a federated authentication protocol; and
wherein the identity assertion is received by emulating a service provider in the second instance of a federated authentication protocol.

2. The method of claim 1, further comprising, in association with a managing account instance, configuring the first instance and the second instance; and prior to transmitting the proxy identity request to the identity provider, selecting the second instance according to an identifier of the managing account from the first instance.

3. The method of claim 1, wherein the federated authentication protocol of the first instance and the second instance is a security assertion markup language protocol (SAML).

4. The method of claim 1, wherein the federated authentication protocol of the first instance and the second instance is an OpenID Connect protocol.

5. The method of claim 1, wherein the first instance is of a first type of protocol; wherein the second instance is of a second type of protocol; and wherein the first type of protocol and second type of protocol are different.

6. The method of claim 5, further comprising translating attributes between the first type of protocol and the second type of protocol.

7. The method of claim 6, wherein the second type of protocol is a lightweight directory access protocol (LDAP).

8. The method of claim 6, wherein translating attributes between the first type of protocol and the second type of protocol comprises translating from attributes of a security assertion markup authentication protocol (SAML) and scopes of an OpenID Connect protocol.

9. The method of claim 1, wherein the proxy server is installed within an internal network.

10. A method comprising:
at a proxy server:
responsive to a service provider identity request in accordance with a federated authentication protocol, determining a proxy identity assertion based on execution of a second layer of authentication, and
providing the determined proxy identity assertion to a service provider corresponding to the service provider identity request;
wherein determining a proxy identity assertion comprises:
determining whether the second layer of authentication is successful;
responsive to a determination that the second layer is successful, obtaining an identity assertion from an identity provider responsive to transmitting a proxy identity request to the identity provider, and determining the proxy identity assertion based on the obtained identity assertion; and
responsive to a determination that the second layer is not successful, providing the determined proxy identity assertion comprises providing a failed proxy identity assertion to the service provider.

11. A method for single sign-on comprising:
at a proxy server:
responsive to an identity assertion of an identity provider in accordance with a federated authentication protocol, determining a proxy identity assertion based on execution of a second layer of authentication, and
providing the determined proxy identity assertion to a service provider;
wherein the proxy server determines the proxy identity assertion based on execution of the second layer of authentication and based on the identity assertion of the identity provider;

wherein the identity assertion is in accordance with a first instance of a federated authentication protocol, and wherein the proxy identity assertion is provided to the service provider in accordance with a second instance of a federated authentication protocol;

wherein the proxy server provides the determined proxy identity assertion to a service provider by emulating an identity provider in the second instance of a federated authentication protocol.

12. The method of claim 11, further comprising, in association with a managing account instance, configuring the first instance and the second instance; and prior to providing the determined proxy identity assertion to the service provider, selecting the second instance according to an identifier of the managing account from the first instance.

13. The method of claim 12, wherein the first instance and second instance are different types of federated authentication protocols, and further comprising translating attributes between the first type of protocol and the second type of protocol.

14. The method of claim 11, further comprising if the second layer of authentication is unsuccessful, returning an error message to the identity provider.

15. The method of claim 11, wherein the first instance of a federated authentication protocol is a protocol of claim-based access control authorization of an active directory federation service.

* * * * *